United States Patent [19]

Krofchak

[11] Patent Number: 5,573,576
[45] Date of Patent: *Nov. 12, 1996

[54] METHOD OF TREATING STEEL MILL WASTE

[75] Inventor: David Krofchak, Oakville, Canada

[73] Assignee: International Solidification, Inc., Ontario, Canada

[*] Notice: The term of this patent shall not extend beyond the expiration date of Pat. No. 5,439,505.

[21] Appl. No.: 494,661

[22] Filed: Jun. 26, 1995

Related U.S. Application Data

[63] Continuation-in-part of Ser. No. 327,761, Oct. 24, 1994, Pat. No. 5,439,505.

[51] Int. Cl.$^6$ .................................................. C22B 1/243
[52] U.S. Cl. ............................... 75/773; 75/961; 75/962; 75/319
[58] Field of Search ............................. 75/773, 961, 962, 75/319

[56] References Cited

U.S. PATENT DOCUMENTS

| | | |
|---|---|---|
| 3,837,872 | 9/1974 | Conner . |
| 3,852,059 | 12/1974 | Bruen et al. . |
| 4,110,212 | 8/1978 | Krofchak . |
| 4,116,705 | 9/1978 | Chappell . |
| 4,216,012 | 8/1980 | Krofchak . |
| 4,229,295 | 10/1980 | Krofchak . |
| 4,279,635 | 7/1981 | Krofchak . |
| 4,385,928 | 5/1983 | Clevely . |
| 4,600,514 | 7/1986 | Connor . |
| 4,687,373 | 8/1989 | Falk et al. . |
| 5,286,274 | 2/1994 | Lindkvist et al. . |
| 5,439,505 | 8/1995 | Krofchak .............................. 75/773 |

FOREIGN PATENT DOCUMENTS

| | | |
|---|---|---|
| 2614848 | 10/1977 | Germany . |
| 61-026537 | 2/1986 | Japan . |
| 61-048453 | 3/1986 | Japan . |
| 15919 | 7/1912 | United Kingdom . |

OTHER PUBLICATIONS

Solidification of Wastes Using Portland Cement, By Adaska et al of The Portland Cement Association and Construction Technology Laboratories, Inc. Published in 1991.

*Primary Examiner*—Melvyn Andrews
*Attorney, Agent, or Firm*—Thompson Hine & Flory P.L.L.

[57] ABSTRACT

A method of treating steel mill waste containing iron oxides and silica includes reacting the steel mill waste with an alkali aqueous solution in an amount sufficient to raise the pH to at least about 7 to solubilize silica to form soluble silicate compounds and silica gels and thereby produce a chemically reactive mixture. The mixture is reacted with an alkaline silicic compound to produce a solid, stable, non-polluting material.

15 Claims, No Drawings

METHOD OF TREATING STEEL MILL WASTE

RELATED APPLICATION

This application is a continuation-in-part of U.S. patent application Ser. No. 08/327,761 filed Oct. 24, 1994 now U.S. Pat. No. 5,439,505.

FIELD OF THE INVENTION

This invention relates to the treatment of steel mill waste to produce secondary material suitable for recycling to steel-making furnaces.

BACKGROUND OF THE INVENTION

The steel industry produces more waste materials than any other manufacturing business. For example, approximately 120 million tons of steel per year are produced in North America and this, in turn, produces about 12 million tons of waste in the form of slag, dust, mill scale, grindings, shot dust, metallic slag fines and sludges, etc. Over half of this is slag which is usually used in aggregates and road materials. The remaining waste mainly comprises iron oxide. By recycling such waste for metal recovery, it may be reclassified as secondary material.

Over the last thirty years, the industry has been required to comply with ever more stringent environmental standards. The dusts and sludges are especially polluted with heavy metals such as lead, zinc, cadmium, chromium and nickel, etc. as a result of processing contaminated scrap metal. Consequently, such dusts and sludges have been classified as hazardous.

Numerous processes have been developed to treat and recycle steel mill secondary materials and waste, but these have failed to provide comprehensive solutions because they only deal with some of the waste and also are very costly. Some of these processes use, for example, plasma arc furnaces, briquetting machines or pelletizing systems.

It is an object of this invention to provide a process for treating steel mill waste inexpensively to produce a product which can be stored safely as a non-polluting secondary material suitable for recycling in various furnaces, for example electric arc furnaces, basic oxygen furnaces or blast furnaces.

SUMMARY OF THE INVENTION

According to the invention, a method of treating steel mill waste containing iron oxides and silica comprises reacting the steel mill waste with an alkali solution in an amount sufficient to raise the pH to at least about 7 to solubilize silica to form soluble silicate compounds and silica gels and produce a chemically reactive mixture. The mixture is reacted with an alkaline silicic compound to produce a solid, stable, non-polluting material.

The alkali may comprise sodium hydroxide, and may be produced by reacting sodium carbonate with calcium oxide in situ.

The alkaline silicic compound may comprise ground blast furnace slag containing calcium silicate, a mixture of calcium silicate and tri-calcium aluminum silicate, or a mixture of calcium silicate cement in the form of ground blast furnace slag and tri-calcium aluminum silicate in the form of Portland cement, which may be Type I or Type III.

The steel mill waste may comprise from about 5 to about 12% by weight carbon dust and from about 1 to about 10% by weight silica. The alkali may comprise from about 0.1 to about 5% by weight sodium carbonate. The silicic compound may comprise from about 1 to about 20% by weight calcium silicate. The weights are percentages of the weight of the mixture and the alkali. The pH may be raised to a value in the range of from about 7 to about 14.

The present invention also provides a method of treating steel mill waste containing from about 10 to about 80% be weight iron oxides, from about 1 to about 65% by weight carbon and from about 1 to about 15% by weight silica, the method comprising reacting the steel mill waste with from about 0.1 to about 5% by weight soluble alkali to produce a strong alkali solution and from about 1 to about 10% by weight lime to raise the pH to at least about 7 to solubilize silica to form soluble silicate compounds and silica gels and thereby produce a chemically reactive mixture, and reacting the mixture with from about 1 to about 20% by weight ground blast furnace slag containing calcium silicate to produce a solid, stable, non-polluting material. Portland cement may be used instead of the slag, or a mixture of slag and Portland cement may be used. The weights are percentages of the weight of the chemically reacted mixture and the slag and/or Portland cement.

The amount of alkali required depends on the nature of the steel mill waste, particularly the unstable polluting dusts, and may be determined by trial and error in any particular instance. Some or all of the alkali may already be present in the waste.

The alkali and steel mill waste may be mixed together by a simple heavy-duty type of mixing apparatus which can be selected according to the nature and stiffness of the mix, and the best apparatus to be used in any particular case will be readily apparent to a person skilled in the art. For example, a readi-mix concrete truck may be especially useful because the mixing can take place on route to delivery.

The amount of silicic compound required depends on the required setting time and, in particular, the required hardness desired for the end use. The amount of silicic compound required is determined by trial and experiment and is mixed into the chemically reactive mixture previously described.

Usually, large batches of materials can be processed within 30 minutes to two hours, and the processed material is laid out to set and harden. This is usually well advanced within 24 hours, and the solidified material can be used within 10 to 40 days for its end use.

Specific examples of the invention will now be described.

EXAMPLE 1

Steel mill waste including dusts and sludges were obtained from an integrated steel company which operated blast furnaces (BF) and basic oxygen furnaces (BOF). These materials were: BOF dust, BF dust, mill scale, ore pellet fines, BF kish (metallic slag fines), carbon dust and lime dust.

The following initial mixture was made up, the percentages by weight;

| | |
|---|---|
| 10% | BOF dust (containing silica $S_iO_2$) |
| 10% | BF dust (containing silica $S_iO_2$) |
| 15% | ore pellet fines |

| | |
|---|---|
| 25% | mill scale (Fe$_3$O$_4$) |
| 15% | kish |
| 10% | carbon dust (top dust from BF), and coke fines used to reduce oxides to iron |
| 5% | waste lime dust. (This eliminates the need to add lime). |
| 1% | sodium carbonate to create strong alkali (sodium hydroxide) from the lime dust. |
| 9% (initially separate) | fine ground blast furnace slag (calcium silicate) comprising the silicic compound. |

The initial blend (less the blast furnace slag) contained sufficient water to make a combination that was mixable to dissolve and disperse the alkali.

After thorough mixing, the fine ground blast furnace slag (calcium silicate) providing the silicic compound was added and mixed, thereby raising the pH to about 14. The mixture started to noticeably stiffen, and it was then placed on the ground to await completion of the reaction and hardening.

The material was hard within 24 hours, and a penetrometer reading indicated a hardness of over 1,000 psi. After ten days, the material was broken up to load into a furnace and heated to a temperature above the melting point of steel. Examination of a cooled sample showed that the material had reduced itself to steel and slag.

An unmelted sample was leached with distilled water after the sample had cured for about 10 days, and an analysis of the water showed that the pH had dropped to about 9, indicating that the alkali had reacted with the silicates. Chromium, lead and cadmium values were all below about 0.1 ppm, well below the recommended Regulatory Limits of 1 to 5 ppm.

EXAMPLE 2

Steel mill waste including bag house dusts were obtained from a ferrous scrap steel minimill which operated electric arc furnaces (EAF). These materials were EAF bag house dust, mill scale and metal grinding dust.

The following initial mixture was made up, the percentages being by weight;

| | |
|---|---|
| 10% | carbon |
| 10% | EAF bag house dust (containing metal oxides and silica) |
| 15% | metal grinding dust |
| 50% | mill scales (Fe$_3$O$_4$) |
| 5% | reagents (1% sodium carbonate and 4% lime) |
| 10% (initially separate) | fine ground slag (calcium silicate) providing the silicic compound |

The materials (less the fine ground slag) were mixed together with sufficient water to a wet, mixable, mortar-like consistency, raising the pH to about 14.

The fine ground slag (calcium silicate) providing the silicic compound was then mixed in. Before the resultant mixture became too stiff to mix further, it was poured out onto the ground to set, harden and cure. After 20 days, it was broken up and fed into an electric furnace where it was consumed without producing any difficulties in the production of steel and slag.

EXAMPLE 3

Samples of waste materials were obtained from a specialty steel mill which produced stainless steel from scrap steels in an electric arc furnace (EAF). These materials were bag house dust and mill scale.

The bag house dust and mill scale contained valuable amounts of chromium, nickel and molybdenum along with the usual iron oxides, lead, cadmium, zinc and silica.

The following initial mixture was made up, the percentages being by weight:

| | |
|---|---|
| 10% | carbon |
| 20% | EAF dust (contains metal oxides including silica) |
| 55% | mill scale (Fe$_3$O$_4$) |
| 6% | reagents, namely 2% sodium carbonate (soda ash) and 4% calcium oxide (lime) |
| 9% (initially separate) | ground BF slag (calcium silicate) providing the silicic compound |

The materials were mixed together with the soda ash and lime and water to make a flowable wet mix with a pH of about 9. The ground BF slag, (calcium silicate) providing the silicic compound was then mixed in. When thoroughly mixed, and before setting started, the batch was dumped on the ground to harden. After several weeks, the material was broken up (it had a hardness of over 1,500 psi) and was used as feedstock to a furnace to recover the metal values.

EXAMPLE 4

Examples 2 and 3 were repeated using Type I or Type III Portland cement (tri-calcium aluminum silicate): instead of slag. Sufficient alkali was present in the waste to produce a pH of about 9. The results were an improvement over the results in the earlier examples in that the products hardened sufficiently in two or three days. Mixtures of slag and Portland cement may also be used.

Numerous other experiments have been conducted using varying amounts of dusts and waste materials and the results have all been essentially the same, although wide variances in setting times and hardness have been experienced.

The method according to this invention advantageously makes use of a variety of steel mill waste products, and consolidates such waste into an environmentally safe and stable product which has significant structural integrity suitable for disposal or for recycling to supplement raw materials fed to steel-making furnaces.

Other embodiments of the invention will be readily apparent to a person skilled in the art, the scope of the invention being defined in the appended claims.

I claim:

1. A method of treating steel mill waste containing iron oxides and silica comprising:
    reacting said steel mill waste with an alkali aqueous solution in an amount sufficient to raise the pH to at least about 7 to solubilize silica to form soluble silicate compounds and silica gels and thereby produce a chemically reactive mixture, and
    reacting said mixture with an alkaline silicic compound to produce a solid, stable, non-polluting material.
2. A method according to claim 1 wherein the alkali comprises sodium hydroxide.
3. A method according to claim 1 wherein the alkali is produced by reacting sodium carbonate with calcium oxide in situ.

4. A method according to claim 1 wherein the alkaline silicic compound comprises ground blast furnace slag containing calcium silicate.

5. A method according to claim 1 wherein the alkaline silicic compound comprises a mixture of calcium silicate and tri-calcium aluminum silicate.

6. A method according to claim 1 wherein the alkaline silicic compound comprises a mixture of ground blast furnace slag and Portland cement.

7. A method according to claim 1 wherein the alkaline silicic compound comprises Type I Portland cement.

8. A method according to claim 1 wherein the alkaline silicic compound comprises Type III Portland cement.

9. A method according to claim 1 wherein the steel mill waste comprises from about 5 to about 12% by weight carbon dust and from about 1 to about 10 % by weight silica.

10. A method according to claim 9, wherein the strong alkali comprises from about 0.1 to about 5% by weight sodium carbonate of the weight of said chemically reactive mixture and said alkaline silicic compound.

11. A method according to claim 9 wherein the alkaline silicic compound comprises from about 1 to about 20% by weight calcium silicate of the weight of said chemically reactive mixture and said alkaline silicic compound.

12. A method according to claim 1 wherein the pH is raised to a value in the range of from about 7 to about 14.

13. A method of treating steel mill waste containing from about 10 to about 80% by weight iron oxides, from about 1 to about 65% by weight carbon, and from about 1 to about 15% by weight silica, comprising:

reacting said steel mill waste with from about 0.1 to about 5% by weight soluble alkali to produce a strong alkali solution and from about 1 to about 10% by weight lime to raise the pH to at least about 7 to solubilize silica to form soluble silicate compounds and silica gels and thereby produce a chemically reactive mixture, and reacting said mixture with from about 1 to about 20% by weight ground blast furnace slag containing calcium silicate to produce a solid, stable, non-polluting material, said weights being percentages of the weight of said chemically reactive mixture and said slag.

14. A method of treating steel mill waste containing from about 10 to about 80% by weight iron oxides, from about 1 to about 65% by weight carbon, and from about 1 to about 15% by weight silica, comprising:

reacting said steel mill waste with from about 0.1 to about 5% by weight soluble alkali to produce a strong alkali solution and from about 1 to about 10% by weight lime to raise the pH to at least about 7 to solubilize silica to form soluble silicate compounds and silica gels and thereby produce a chemically reactive mixture, and reacting said mixture with from about 1 to about 20% by weight Portland cement to produce a solid stable and non-polluting material, said weights being percentages of the weight of said chemically reactive mixture and said Portland cement.

15. A method of treating steel mill waste containing from about 10 to about 80% by weight iron oxides, from about 1 to about 65% by weight carbon, and from about 1 to about 15% by weight silica, comprising:

reacting said steel mill waste with from about 0.1 to about 5% by weight soluble alkali to produce a strong alkali solution and from about 1 to about 10% by weight lime to raise the pH to at least about 7 to solubilize silica to form soluble silicate compounds and silica gels and thereby produce a chemically reactive mixture, and reacting said mixture with from about 1 to about 20% by weight of a mixture of ground blast furnace slag containing calcium silicate and Portland cement to produce a solid stable non-polluting material, said weights being percentages of the weight of said chemically reactive mixture and said mixture of slag and Portland cement.

\* \* \* \* \*